(12) United States Patent
Porter

(10) Patent No.: US 6,725,615 B1
(45) Date of Patent: Apr. 27, 2004

(54) SERVICE SHUT OFF DEVICE

(75) Inventor: Raymond Porter, Heathfield (AU)

(73) Assignee: Promat Fyreguard Pty Ltd., Heathfield (AU)

( * ) Notice: Subject to any disclaimer, the term of this patent is extended or adjusted under 35 U.S.C. 154(b) by 0 days.

(21) Appl. No.: 09/979,806

(22) PCT Filed: May 5, 2000

(86) PCT No.: PCT/AU00/00407

§ 371 (c)(1), (2), (4) Date: Nov. 6, 2001

(87) PCT Pub. No.: WO00/68608

PCT Pub. Date: Nov. 16, 2000

(30) Foreign Application Priority Data

May 7, 1999 (AU) .............................................. PQ0240

(51) Int. Cl.⁷ ................................................. F16L 5/00
(52) U.S. Cl. ........................ 52/232; 52/1; 52/98; 52/99
(58) Field of Search ............................... 52/232, 220.8, 52/1, 98, 99; 137/75

(56) References Cited

U.S. PATENT DOCUMENTS

| 4,249,353 | A | * | 2/1981 | Berry ........................... 52/232 |
| 4,748,787 | A | * | 6/1988 | Harbeke ..................... 52/741.3 |
| 4,850,385 | A | * | 7/1989 | Harbeke ........................ 137/75 |
| 4,894,966 | A | * | 1/1990 | Bailey et al. ................. 52/317 |
| 4,951,442 | A |   | 8/1990 | Harbeke, Jr. |
| 5,005,531 | A | * | 4/1991 | Nelson ....................... 122/19.2 |
| 5,103,609 | A |   | 4/1992 | Thoreson et al. |
| 5,155,957 | A | * | 10/1992 | Robertson et al. ............ 52/232 |
| 5,174,077 | A |   | 12/1992 | Murota |
| 5,452,551 | A | * | 9/1995 | Charland et al. ............. 52/232 |
| 5,498,466 | A | * | 3/1996 | Navarro et al. ............. 428/408 |
| 5,586,739 | A |   | 12/1996 | Gantner et al. |
| 5,887,396 | A | * | 3/1999 | Thoreson ..................... 52/232 |
| 6,029,412 | A | * | 2/2000 | Gohlke ........................ 52/232 |

FOREIGN PATENT DOCUMENTS

| AU | 74606/94 | 7/1994 |
| AU | 75397/96 | 6/1997 |
| CH | 689023 | 7/1998 |
| DE | G 90 14 617.8 | 10/1990 |
| DE | 4113375 | 10/1991 |
| GB | 2111624 | 7/1983 |
| GB | 2216220 | 10/1989 |
| GB | 2233725 | 1/1991 |
| GB | 2281858 | 3/1995 |
| GB | 2334770 | 9/1997 |
| WO | WO 89/04407 | 5/1989 |
| WO | WO 97/04838 | 2/1997 |

* cited by examiner

Primary Examiner—Carl D. Friedman
Assistant Examiner—Basil Katcheves
(74) Attorney, Agent, or Firm—Gordon & Rees LLP

(57) ABSTRACT

A service shut off device which is a selected length of a composite body adapted to be formed into a shape to fit in use around a service line. The composite body has a flexible casing (20) and a body of intumescent material (28) received in the casing. The body of intumescent material (28) may be continuous. The composite body has means (32) associated with the casing to contain the intumescent material within the casing and means (36) to retain the collar in a selected shape around the service line. Mounting brackets (36) can clip onto the body or be part of the body.

37 Claims, 14 Drawing Sheets

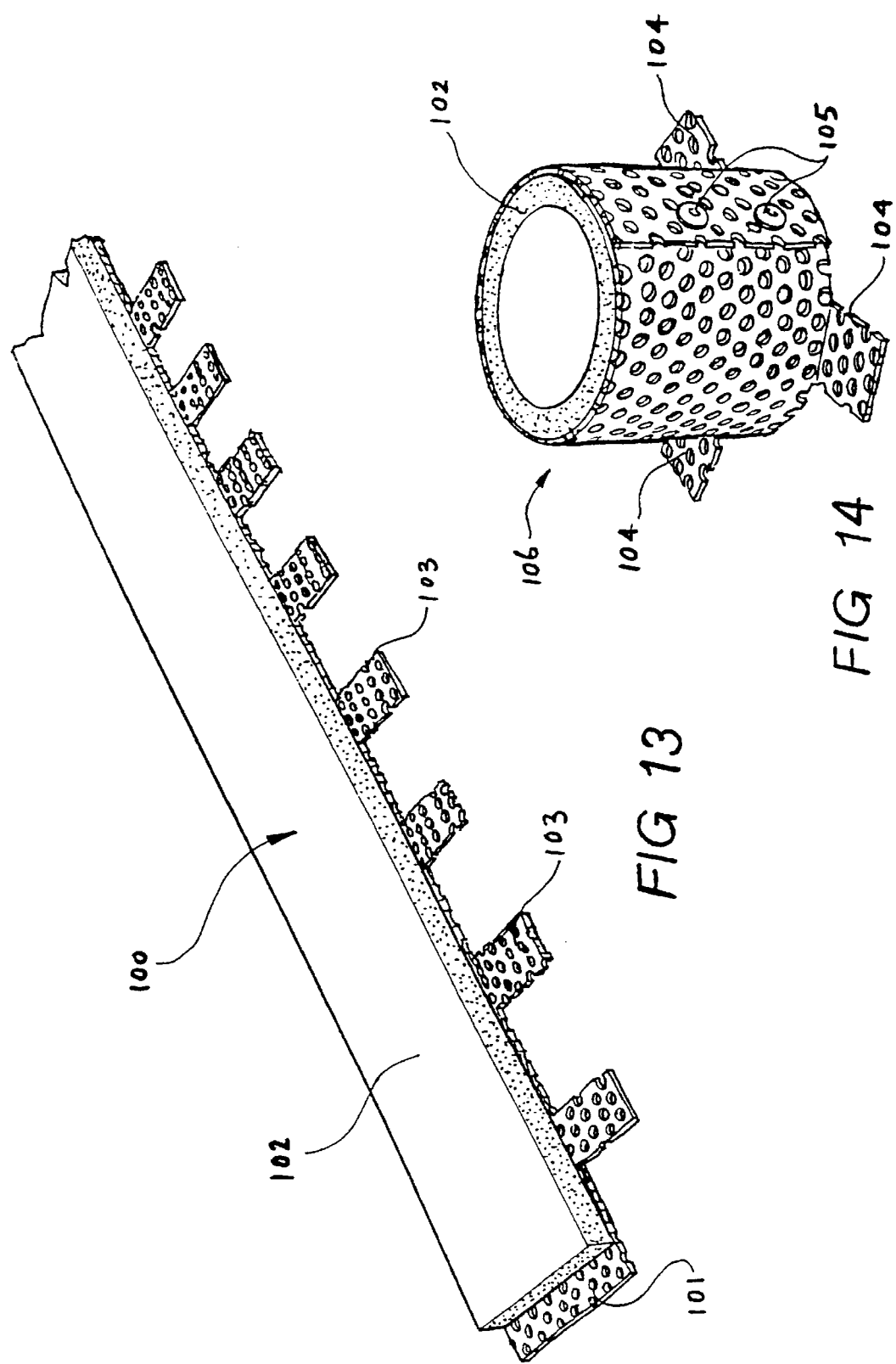

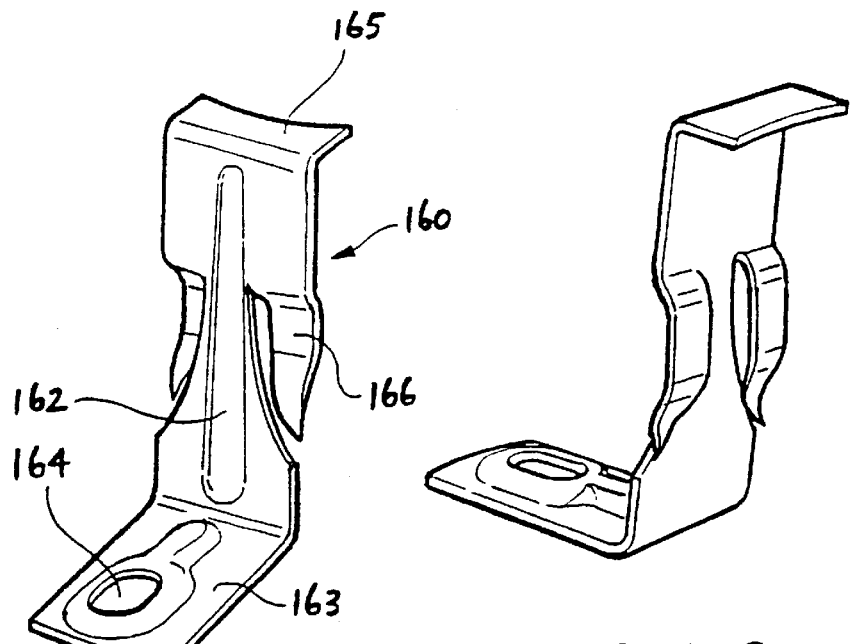
FIG 20
FIG 21
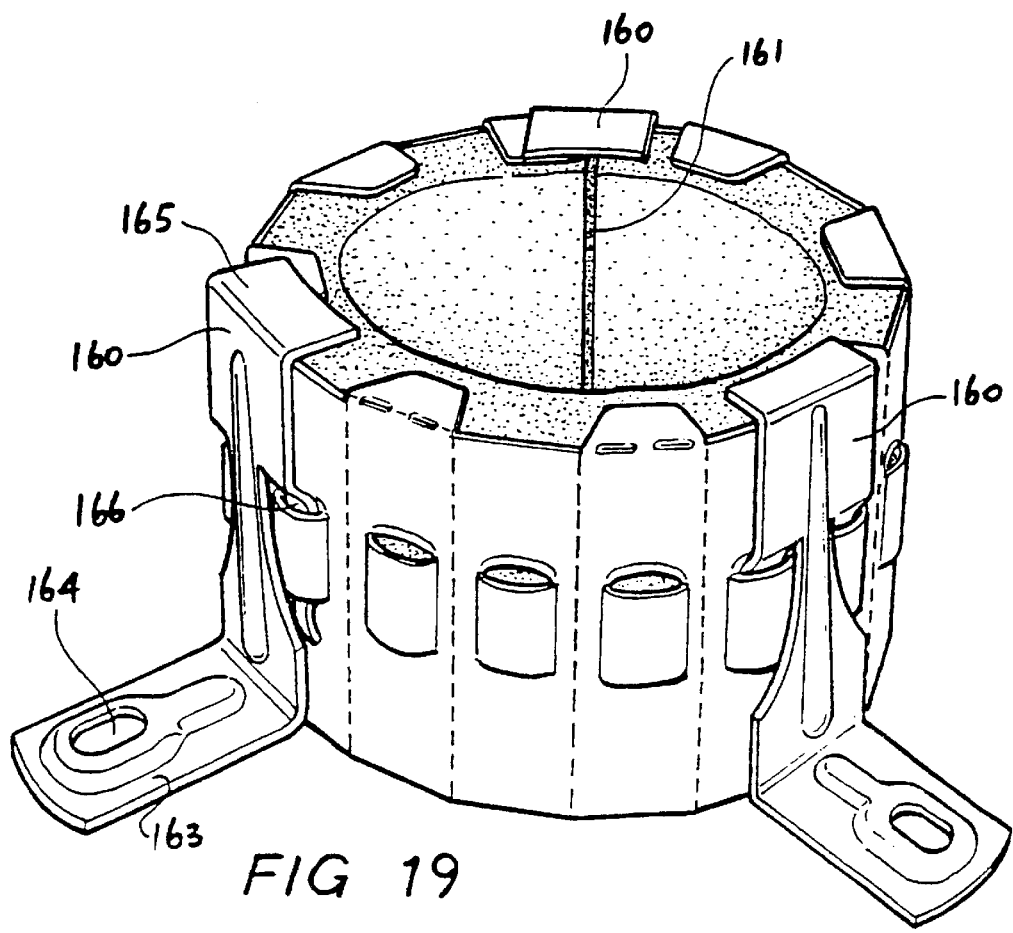
FIG 19

SERVICE SHUT OFF DEVICE

FIELD OF INVENTION

This invention relates to service shut off devices and more particularly to articles known as fire collars.

BACKGROUND

Service shut off devices or fire collars are placed around service lines such as plastics materials pipes or cable trays where they pass through a wall or soffit so that in the event of a fire intumescent material within the service shut off devices or fire collars will expand and close off the hole through the wall or soffit to prevent the fire passing from one part of a building to another.

Service shut off devices or fire collars are generally made for a single size of pipe or cable tray or other service line and therefore where a major installation is occurring and there may be a number of different sizes and shapes of plastic pipes, cable trays or other service lines then a large stock of service shut off devices or fire collars is necessary.

It is the object of this invention to provide a service shut off device or fire collar arrangement where a large range of different size and shape stocks is not necessary.

BRIEF DESCRIPTION OF THE INVENTION

In one form, therefore, the invention is said to reside in a service shut off device comprising a selected length of a composite body adapted to be formed into a shape to fit in use around a service line, the composite body having a flexible casing and a body of intumescent material received in the casing, the composite body further comprising means associated with the casing to contain the intumescent material within the casing and means to retain the collar in a selected shape around the service line.

Preferably the body of intumescent material is continuous. The body of intumescent material may be transversely cut or perforated at intervals to assist with selection of the required length of the service shut off device.

It will be seen that by this means a selected length of a strip of service shut off device or fire collar material can be wrapped around a cable tray, service line or a pipe or formed into selected shape to be placed around a cable tray, service line or a pipe and retained in that shape.

In one preferred embodiment of the invention the flexible casing may be substantially U-shaped with the intumescent material received in the hollow of the U-shape.

Alternatively the casing may only provide a backing for the intumescent material or may provide a backing and one edge.

Preferably the casing may be made from a metallic material such as sheet aluminium, stainless steel or steel and may be anodised or galvanised to prevent corrosion in an installation. The casing may comprise a perforated metal sheeting which is flexible enough to be bent into the required shape.

Alternatively the casing may be manufactured from a composite material such as a glass reinforced material or the like.

The flexibility of the casing may be provided by a plurality of transverse lines of weakening in the casing and the intumescent material being sufficiently flexible to be able to be bent around the service line or pipe or containing areas of weakening to enable it to be bent into a selected shape such as a circular shape.

The means to retain the collar in the selected shape such as a circular shape may be a wire or other strap material which can be wound around the collar when it is formed into the selected shape and joined to hold the collar in that shape. Alternatively fasteners such as screws or blind rivets may be used to hold the device in the selected shape.

In one embodiment the service shut off device or fire collar may be adapted to be formed around a service line within a wall or soffit or alternatively the service shut off device or fire collar may be mounted against a wall or soffit.

There may be provided brackets either associated with the casing or a separate bracket which can be fastened onto the casing to hold the casing against a wall or soffit.

There may be tabs extending from the casing which may provide the brackets.

There may be a plurality of co-acting connecting pieces on the bracket and the casing so that the racket is retained onto the casing.

The co-acting connecting piece between the casing and the bracket may also act to be a connector between the ends of the casing of the composite body to both retain the casing in the selected shape and to be used as a bracket. Hence the bracket both holds the selected shape of the fire collar and acts as a mounting bracket.

The means associated with the casing to contain the intumescent material within the casing may be an adhesive. Alternatively it may include a plurality of tabs associated with the casing which extend against or into the intumescent material.

The means to retain the collar in the selected shape may include a link member, the link member having a plurality of pins adapted to co-act with apertures on the casing across a join in the casing whereby the collar is retained in the selected shape.

The service shut off device may include a plurality of co-acting connecting pieces on the bracket and the casing so that the bracket is retained onto the casing.

The service shut off device may be provided by a stack of more than one service shut off device as discussed above.

In an alternative form the invention is said to reside in a continuous strip fire collar material including a casing and a continuous flexible intumescent material within the casing, the strip comprising the casing and intumescent material adapted to be severed at selected intervals along the length of the continuous strip such that the strip can be cut off at the selected length and the severed portion wrapped around a service line such as a pipe or cable tray to provide a fire collar.

The casing may be sufficiently flexible to enable it to be formed into the selected shape or the casing may be provided with transverse lines of weakening at intervals along its length so that it may be wrapped into a selected shape of a fire collar.

The transverse points of weakening may be done by a plurality of perforations transverse to the length of the strip, or alternatively may be done by thinning of the material in transverse lines across the strip material.

Such transverse lines of weakening may also provide the regions at which the strip of material can be severed to form the individual lengths for the fire collar and also enable it to be bent around or wrapped around to form a selected shape for the fire collar.

The casing may include lugs formed or bent out of the plane of the casing to extend onto or into the intumescent material within the casing to retain the intumescent material in the casing.

The casing may also include tabs extending from the casing which may be bent out to provide brackets to mount the service shut off device to a wall or soffit.

In one preferred embodiment the casing may be comprised of a face section and two side sections adapted in use to provide a substantially U-shaped body. The lugs bent out of the casing may be on the face of the casing or on one of the side sections.

Alternatively the casing may only provide a backing for the intumescent material or may provide a backing and one edge.

Preferably the side sections are formed from a plurality of tabs configured such that upon bending of the continuous strip into a selected shape such as a circular shape the tabs enable the inner side of the strip to form a smaller radius than the outer side. The tabs may overlap or pass under adjacent tabs to enable the bending. One method by which this can be done is to provide two bend lines between the face section and each side section with the lines separated by essentially the thickness of the casing material. Alternate tabs may be bent on one line and the in between tabs bent on the other line. Alternatively a bend line for each tab may be angled to the direction of elongation of the strip so that during bending a tab passes under the adjacent tab on one side and over the adjacent tab on its other side.

There may be further provided from one or both of the side sections tongues extending from the side sections and which are folded over the intumescent material such that they are substantially parallel to the face. One tongue may extend from each tab on each side. Such tongues may assist in retaining the intumescent material within the casing and to assist with crushing of a pipe when the intumescent material is expanding in use or to assist with transfer of heat to the pipe so that it assists with softening of the pipe.

There may be further provided brackets to mount the fire collar to a wall or ceiling or soffit in use.

The brackets may be adapted to clip onto the casing so that they are attained with the casing.

In one preferred embodiment of the invention there may be provided a plurality of co-acting connecting portions on the brackets and collar so that the bracket can be retained onto the collar. In one form the co-acting connecting arrangement may be a plurality of slots formed in the casing with a plurality of pins on the brackets. Alternatively the pins may be provided on the casing and the slots on the brackets.

There may be further provided means to retain the continuous strip of material into a selected shape such as a circular shape. Such a means may be comprised of wire or other strip material adapted to be wrapped around the casing and joined together to form the selected shape of the fire collar.

Alternatively the joining of the continuous strip into the selected shape may be done by the brackets being mounted by the co-acting connecting portions on both ends of the strip when wrapped in the selected shape so that the bracket acts as both the mounting bracket and retainer for the selected shape. In such an embodiment the bracket may include at least two pairs of co-acting connecting catch means so that the casing can be gripped across the joint.

The intumescent material may be retained onto the casing by an adhesive.

It will be seen that generally from this invention by having a continuous strip of fire collar material the strip can be broken off or severed in a selected length and then wrapped around a service line such as a cable tray or pipe. Hence a tradesman need only carry a continuous length of the material onto site and the material cut off to length as required.

The continuous strip of the present invention may be transported in a packaging system for a continuous strip material type of the type discussed above which is adapted to be used in a selected length, the packaging comprising a cuboidal body adapted to contain a roll of the continuous strip material, the cuboidal body having two opposed sides and two pairs of opposed edges, a slot in a first edge of the cuboidal body through which the material may be drawn and markings on the packaging on or adjacent the first edge to enable measurement of the selected length.

It will be seen that by use of such a packaging system a continuous strip such as the continuous strip of fire collar material may be stored within the packaging and the strip drawn out just to the length required then the strip broken off or severed off by other means to give the strip of material which can be formed into the fire collar.

The packaging system may also include a drawer or other receptacle within the body which can hold the brackets or other means for retaining the fire collar into a circular shape.

The packaging system may also have an axis formed into it from one face to the other so the roll of strip material is supported while it is being unwound or alternatively shaping of packing within the packaging may assist to retain the roll of strip material in a substantially wound form.

There may be slot in one of the faces so that a user may view the strip within the casing to see what length of the strip is still remaining.

In a further form the invention may be said to reside in an intumescent material for a service shut off device, the intumescent material including a plurality of voids such that a strip of the material can be formed into substantially circular shape with the material being compressed and absorbing the compression by means of the voids to allow for an inner circumference which is smaller than an outer circumference.

Preferably the intumescent material has a backing material which is a non woven fibrous material and the non woven fibrous material is severed transversely at intervals to provide lines of weakening for cutting of the strip to a required length.

In a further form the invention may be said to reside in a service shut off device comprising a stack of two or more fire collars.

By this arrangement there can be obtained a faster shut off or a more powerful shut off of a service line such as a pipe.

This then generally describes the invention but to assist with understanding, reference will now be made to the accompanying drawings which show a preferred embodiment of the invention.

BRIEF DESCRIPTION OF THE DRAWINGS

In the drawings:

FIG. 13 shows a further embodiment of continuous strip adapted to form a service shut off device such as a fire collar for smaller diameter pipes, FIG. 14 shows a service shut off device such as a fire collar for smaller diameter pipes formed from the strip of FIG. 13, FIG. 19 shows an alternative embodiment of fire collar according to the present invention, FIG. 20 shows a bracket suitable for the fire collar of FIG. 19, FIG. 21 shows an alternative view of the bracket shown in FIG. 20.

DETAILED DESCRIPTION

A service shut off device comprising a selected length of a composite body adapted to be formed into a shape to fit in use around a service line, the composite body having a flexible casing and a continuous body of intumescent material received in the casing, the composite body further comprising means associated with the casing to contain the intumescent material within the casing and means to retain the collar in a selected shape around the service line.

A service shut off device comprising a selected length of a composite body adapted to be formed into a shape to fit in use around a service line, the composite body having a flexible casing and a continuous body of intumescent material received in the casing, the composite body further comprising means associated with the casing to contain the intumescent material within the casing and means to retain the collar in a selected shape around the service line.

A service shut off device comprising a selected length of a composite body adapted to be formed into a shape to fit in use around a service line, the composite body having a flexible casing and a continuous body of intumescent material received in the casing, the composite body further comprising means associated with the casing to contain the intumescent material within the casing and means to retain the collar in a selected shape around the service line.

Figure 1:
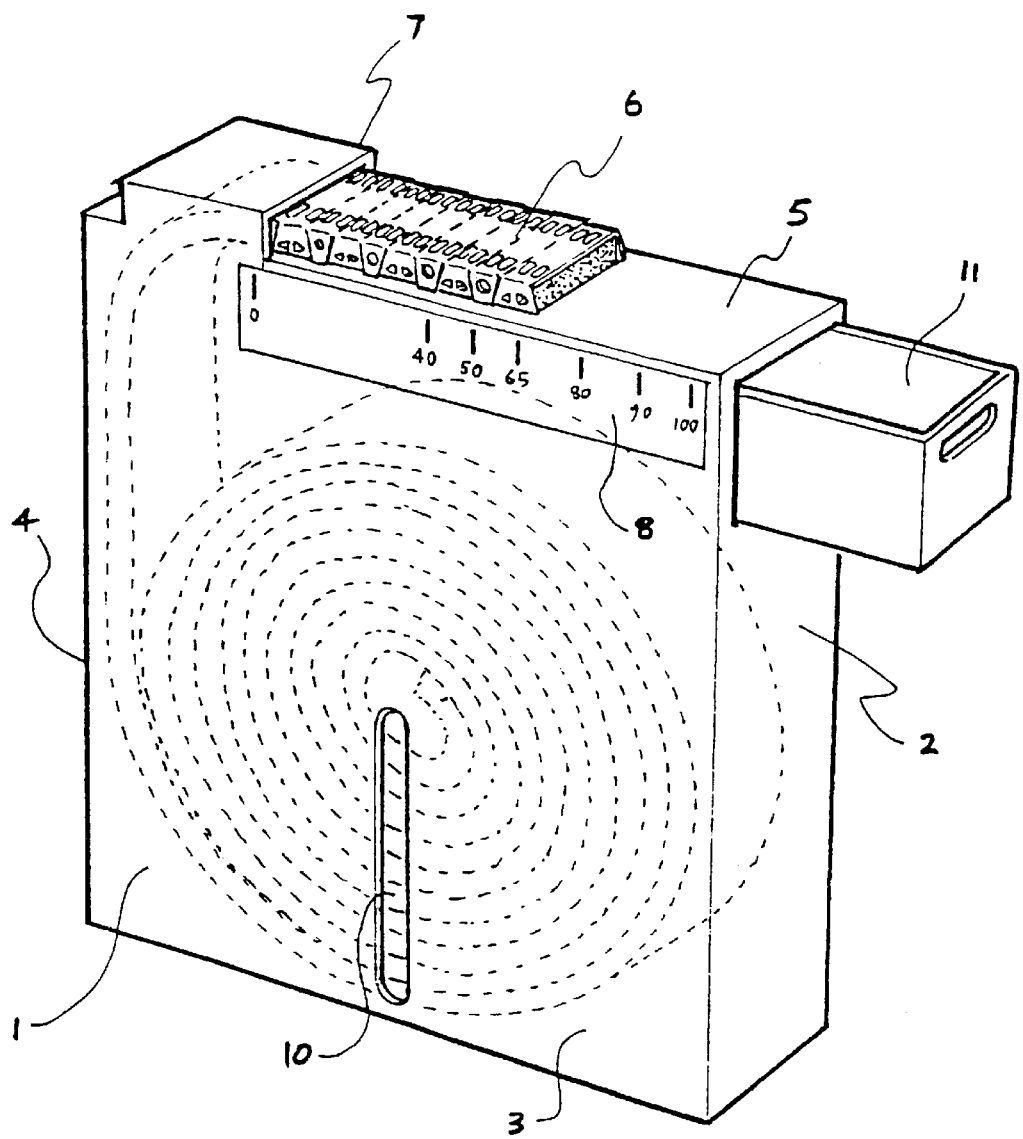
FIG. 1 shows a packaging arrangement for a continuous strip of fire collar material.
Figure 2:
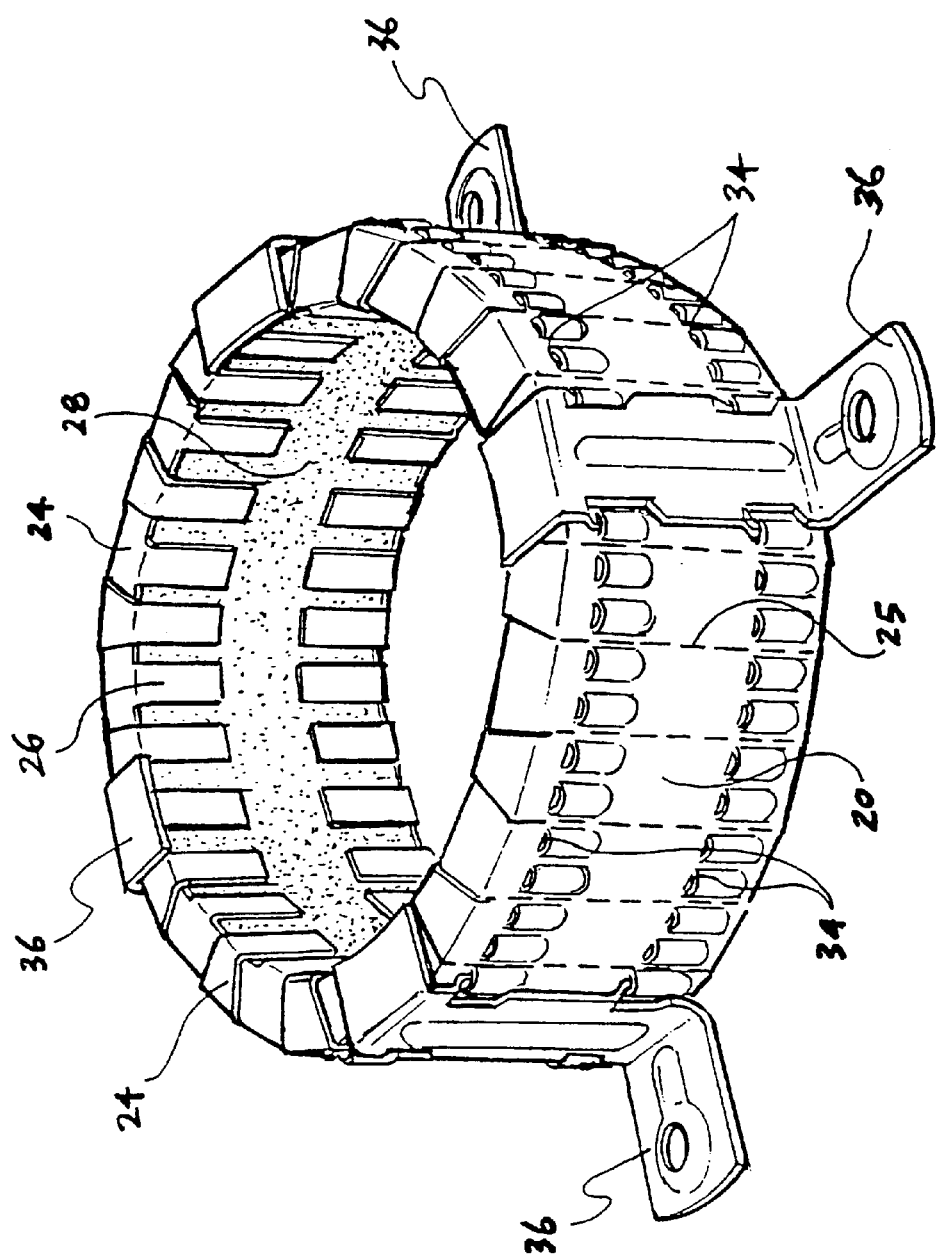
FIG. 2 shows a fire collar formed into a circular shape using the continuous strip of the present invention.

Now looking at the drawings in more detail, it will be seen in FIG. 1 that the packaging for a continuous strip of fire collar material comprises a generally cuboidal box which may be preferably made out of cardboard which has a face 1 and edges 2, 3, 4 and 5. Within the box there is a spiral coil of intumescent fire collar material which has an end 6 extending out of a slot 7 in the face 5. Markings 8 on the face 1 adjacent the edge 5 show the length of material drawn out of the slot so that a cutting point is known.

A slot 10 in the face 1 enables a user to see the strip material within the casing so that the amount remaining can be checked.

A drawer 11 is provided in the face 2. The drawer can retain brackets and mounting nails, screws or bolts for the fire collar. The drawer may be positioned with its opening upwards or to one side depending upon the intended orientation of the packaging in use.

FIGS. 2 to 5 show an embodiment of a continuous strip of material and a fire collar made from the strip according to this invention.

The fire collar in use generally comprises an elongated strip of material formed into a circular shape and retained in that shape.

Figure 3:
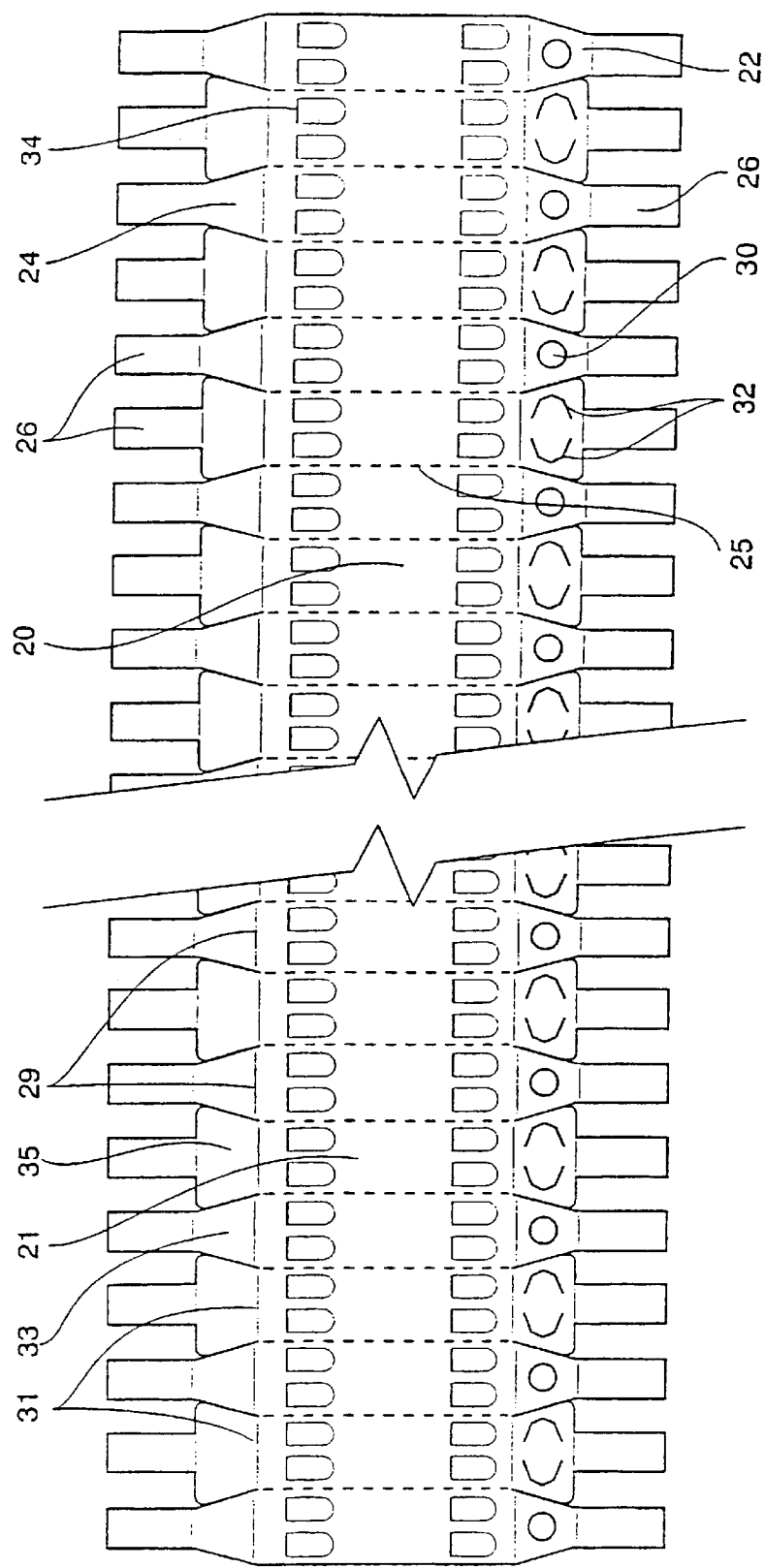
FIG. 3 shows a preferred embodiment of a strip of casing material according to one embodiment of the invention.

The fire collar comprises a casing 20 which in its unformed shape can be seen in FIG. 3. As can be seen in particularly FIGS. 4 and 5 the casing is of a substantially U-shape having a face 21 and two edges 22 and 24. The edges are cut at intervals as can best be seen in FIG. 3 so that the collar can be rolled into a circular shape. Tabs 26 extend from each portion of the segmented edges which in use fold over the intumescent material 28 within the casing 20.

In the segmented edge 22 there are formed on alternative segments apertures 30 and pairs of U-shaped lugs 32.

The U-shaped lugs 32 are folded inwards to cut into the intumescent material to retain it in place within casing.

In use the edge 22 is mounted against a wall or socket and the apertures 30 and, apertures formed by the lugs 32 being bent inwards allow a certain amount of intumescent material to flow against the wall or socket to provide a seal at the base of the collar.

On the outer side of the casing 20 are two lines of slots 34 these slots co-act with pins on brackets 36 to hold the brackets to the casing and to join the strip of collar material into a circular shape.

As can be best seen in the strip blank shown in FIG. 3 there are two lines of bend lines on each side of the strip. A first line of bend lines 31 is used for the tabs 33 and a second set of lines 29 is used for the tabs 35. By this arrangement after the formation of the continuous strip then during the bending of the strip into the circular shape of whatever diameter the ends of the tabs 35 with the wider portion away from the face 21 will be lower than the tabs 33 and pass under the tabs 33.

Figures 6, 7:
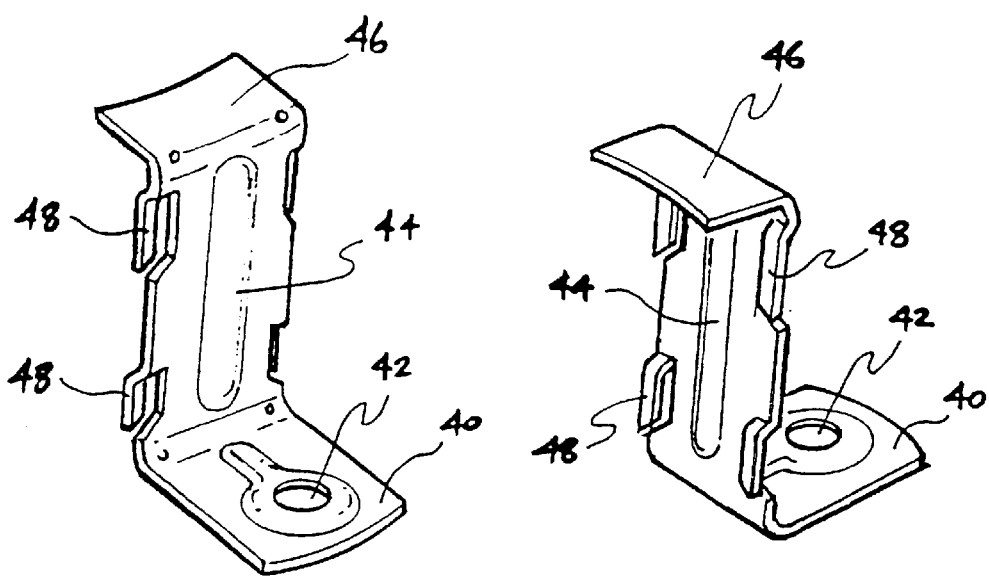
FIG. 6 shows one view of a bracket for a collar according to this invention.
FIG. 7 shows a further view of the bracket shown in FIG. 6.

The brackets can be seen in more detail in FIGS. 6 and 7.

On each bracket there is a portion 40 including an aperture 42 so that the bracket be mounted to a wall or socket and an upstanding body part 44 and an upper tongue 46. Pins 48 are bent out of the upstanding portion 44 and bend inwardly and in use are received in the slots 34 in the casing to mount the bracket to the casing.

As discussed earlier the pins 48 may also act to hold the collar into the circular shape by being received in slots 34 on either side of a join.

Pairs of slots may be provided on each segment of the casing so that differences in required diameter can be taken up.

Lines of transverse weakening 25 may be provided at intervals along the length of the casing so that casing may be cut or otherwise severed such as by breaking at the selected points.

Also lines of weakening 27 may be provided within the intumescent material to enable it to be broken off at the selected length.

Figure 8:
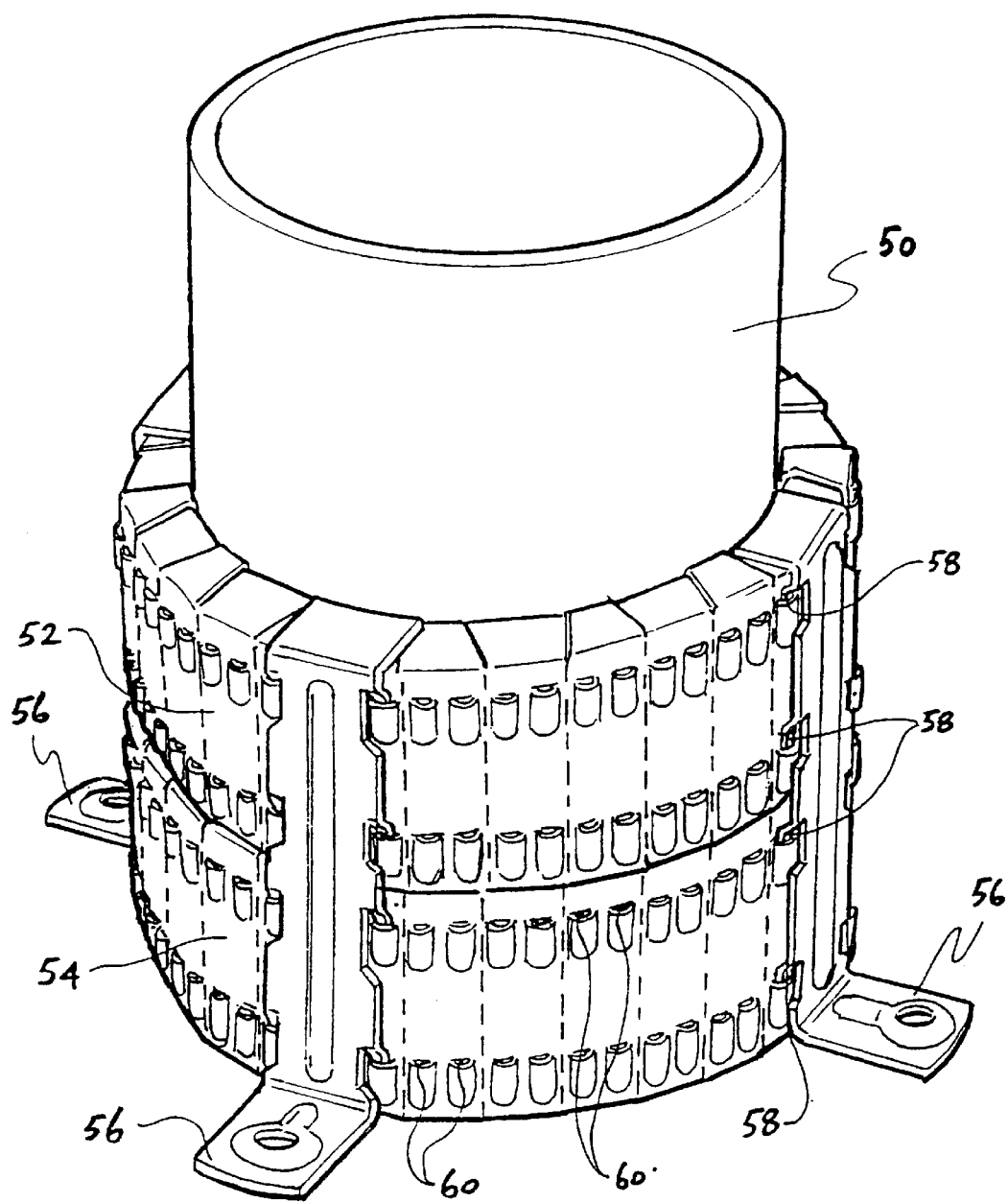
FIG. 8 shows an embodiment of fire collar according to this invention utilising two fire collars for larger diameter pipes.

FIG. 8 shows an embodiment of fire collar according to this invention which utilises two continuous strips according to this invention and formed into circular portions to go around pipes of a larger diameter. Pipe 50 may be of a diameter greater than 100 mm and has a first strip 52 and a second strip 54 wound around it and stacked one on top the other. Double length brackets 56 with retaining pins 58 which extend into recesses 60 in both collars may be provided to ensure that the fire collar is retained in position. Alternatively there may be pins 58 only in the upper portion of the bracket that extend into the upper collar 54 so that only the upper collar is specifically retained.

Figure 9:
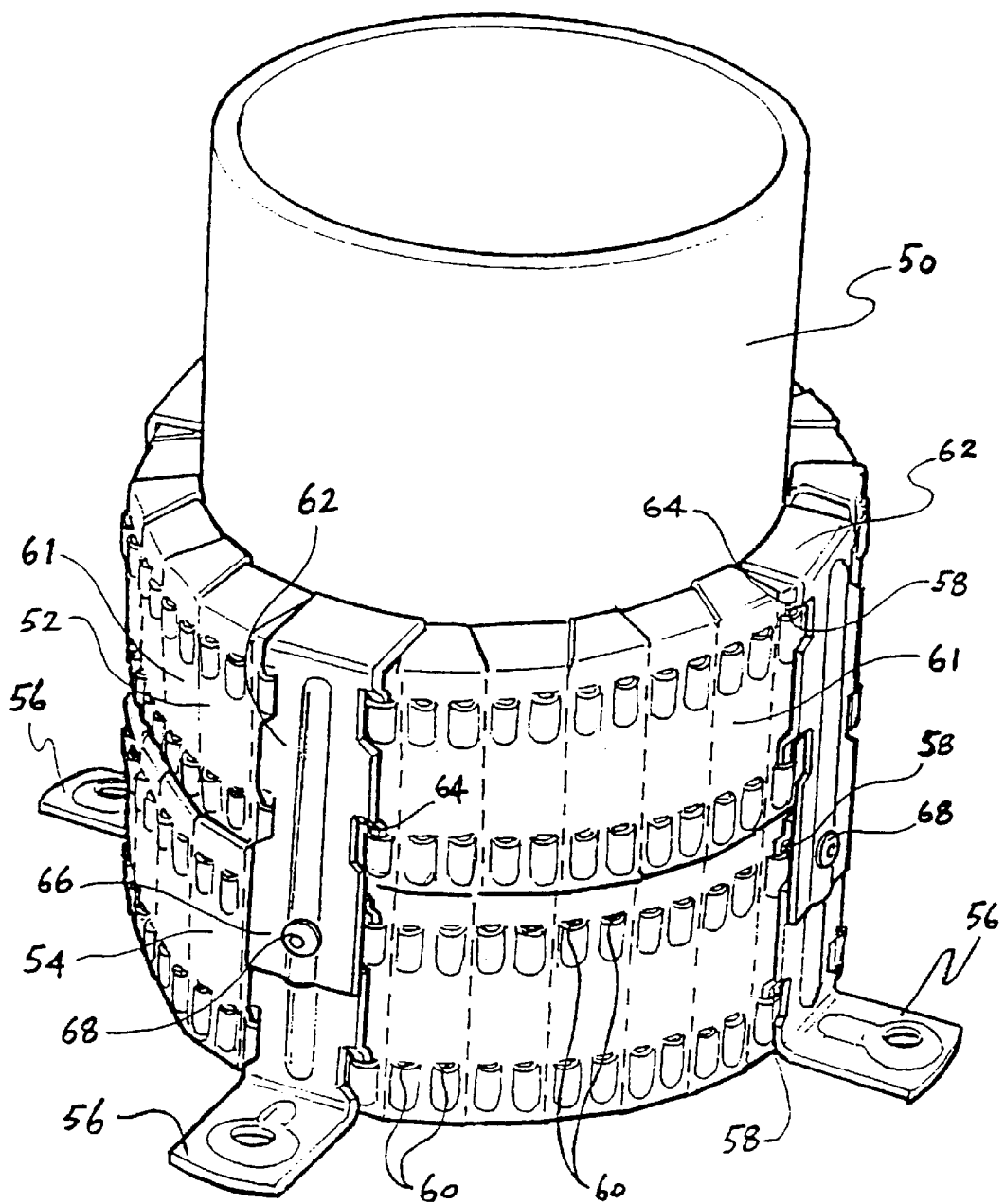
FIG. 9 shows a similar embodiment as that in FIG. 8 utilising two fire collars for larger diameter pipes but with a different method of retaining the collars.

FIG. 9 shows a similar embodiment to that shown in FIG. 8 but in this case the mounting of the second collar is different In this embodiment the first collar 54 is formed into the selected shape and the brackets 56 used to hold the collar in that shape. A second collar 61 is then formed and held in its shape by the brackets 62 which have retaining pins 64 in a similar manner to the bracket 56. The bracket 62 has an extension 66 which passes over the bracket 56 and is fastened to the bracket 56 by a fastener such as a blind rivet 68.

Figure 10:
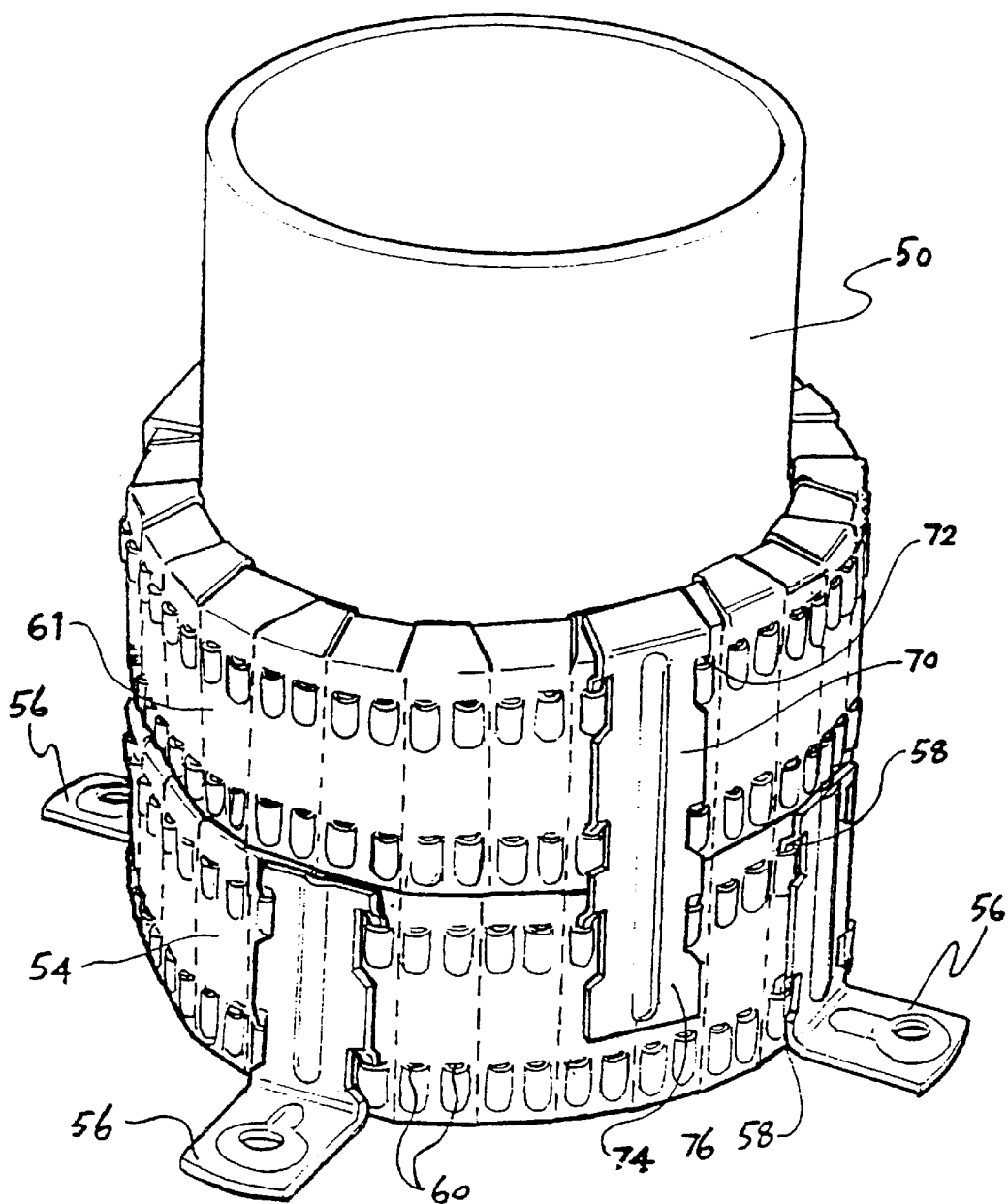
FIG. 10 shows a similar embodiment as that in FIG. 8 utilising two fire collars for larger diameter pipes but with a different method of retaining the collars.

FIG. 10 shows a similar embodiment to that shown in FIG. 8 but in this case the mounting of the second collar is again different. In this embodiment the first collar 54 is formed into the selected shape and the brackets 56 used to hold the collar in that shape. A second collar 61 is then formed and held in its shape by the brackets 70 which have retaining pins 72 in a similar manner to the bracket 56. The bracket 70 has an extension 74 which also has retaining pins 76 and the extension 74 of the bracket 70 passes over the first collar 54 not in the region of the bracket 56 so that its pins 76 can be received in the recesses 60 to hold the two collars together.

It may be noted that the invention is not restricted to the use of one fire collar or two stacked together but also includes multiple stacking of service shut off devices.

Figure 11:
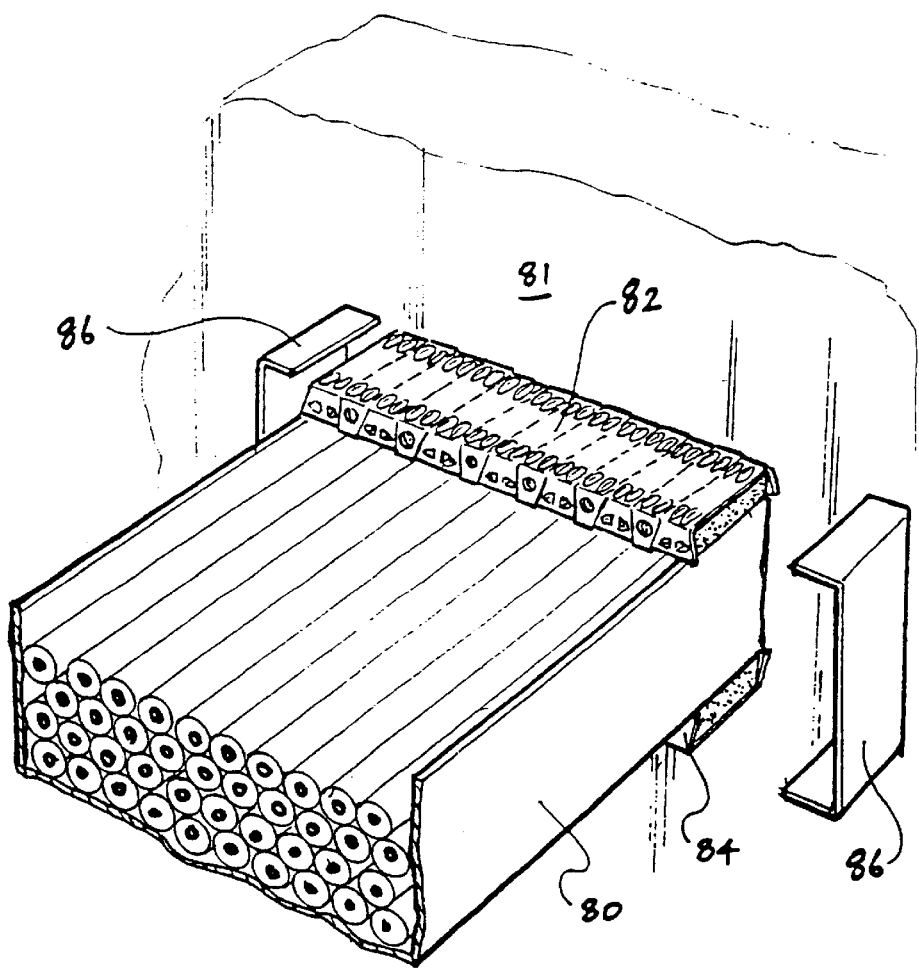
FIG. 11 shows a further embodiment of a service shut off device suitable for cable trays.

FIG. 11 shows a cable tray 80 passing through a wall 81. Above and below the cable tray are strips of service shut off device according to this invention 82 and 84 which are held together by brackets 86 at each end.

Figure 12:
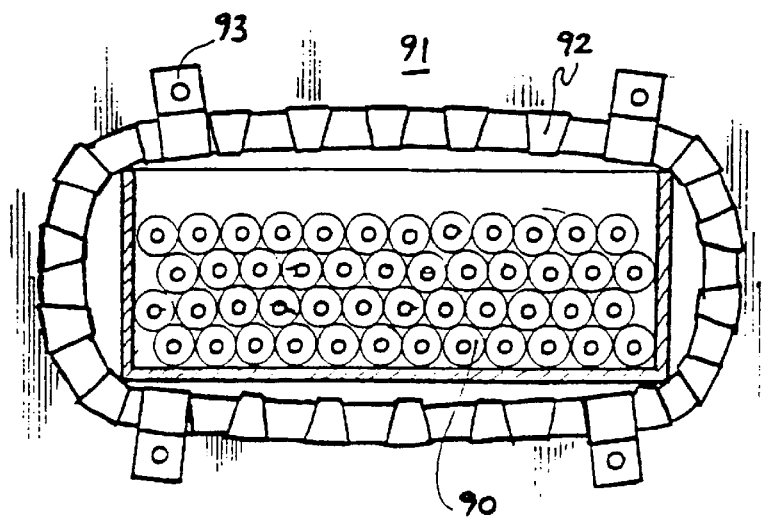
FIG. 12 shows a still further embodiment of a service shut off device suitable for cable trays.

FIG. 12 shows a cable tray 90 passing through a wall 91. In this embodiment a service shut off device according to this invention 92 has been formed into an oblong shape with rounded ends around the cable tray 90. Brackets 93 are used to hold the service shut off device 92 against the wall 91.

FIG. 13 shows a further embodiment of continuous strip adapted to form a service shut off device such as a fire collar for smaller diameter pipes.

The continuous strip 100 is formed from a strip of perforated metal 101 with a strip of intumescent material 102 attached to one side by an adhesive. The strip 101 has tabs 103 extending laterally at intervals. In use the strip can be cut off at a selected length and the intumescent material 102 cut back to allow the metal strip to overlap so that it can be fastened in a selected shape such as circular as shown in FIG. 14 by the use of fasteners 105 such as blind rivets or screws.

Figure 15:
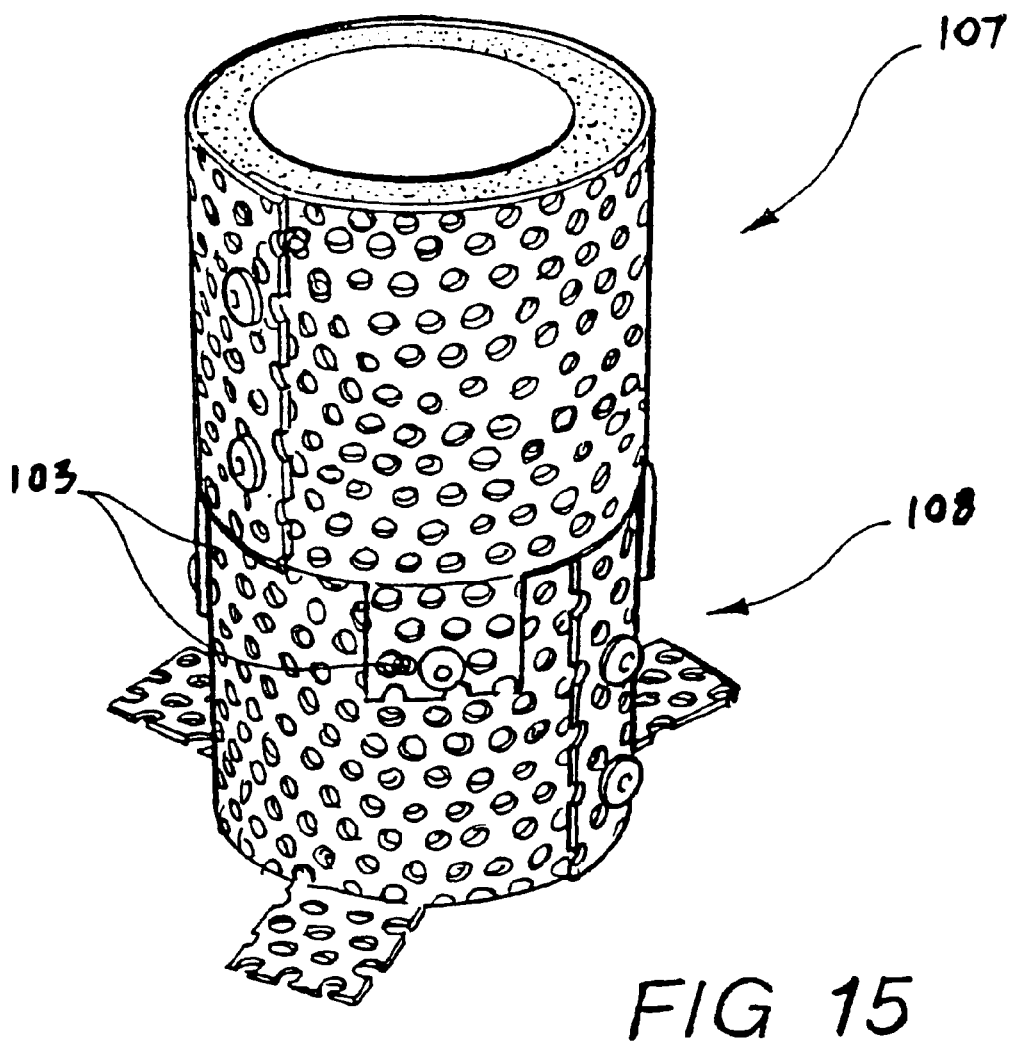
FIG. 15 shows a stacked arrangement of two service shut off devices of FIG. 14.

Once the service shut off device has beer formed in to the selected shape the tabs 103 may be bent out to form brackets 104 to enable the service shut off device to be mounted around a pipe and to a surface.

Where a faster shut off or a more powerful shut off of a service line is required two of the service shut off devices as shown in FIG. 14 may be stacked together as shown in FIG. 15. In this embodiment the tabs 103 on the upper service shut off device 107 have been bent down to enable the upper service shut off device 107 to be fastened to the lower service shut off device 108 by the use of fasteners 109 such as blind rivets or screws. The tabs 103 on the lower service shut off device 108 have been bent out to form brackets 104 to enable the stacked service shut off device to be mounted to a surface.

Figure 16:
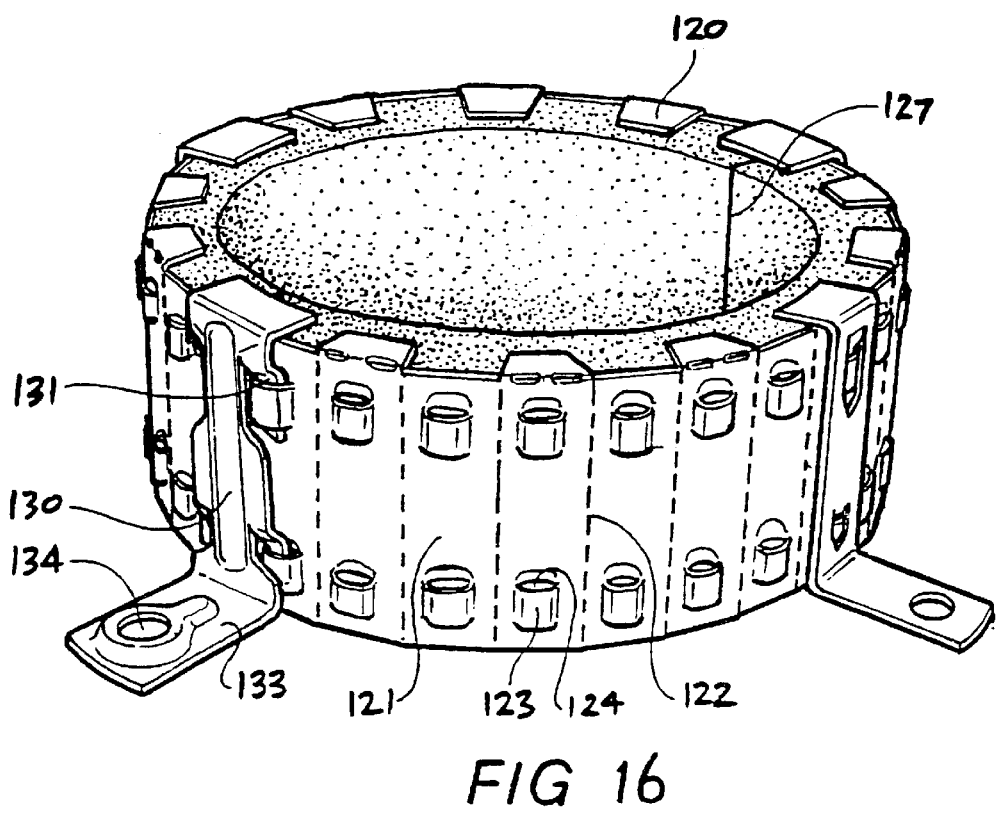
FIG. 16 shows an alternative embodiment of a service shut off device according to the present invention.

FIGS. 16, 17, 19 and 22 show an alternative embodiment of continuous strip surface shut off device according to this invention, a service shut off device from using the continuous strip and a bracket suitable for holding the service shut off device. The continuous strip comprises intumescent material 120 fastened to a metal backing 121 by means of an adhesive. The backing 121 has transverse lines of perforation 122 at regular intervals. The continuous strip of service shut off device material can be cut off at a selected length by cutting through the intumescent material adjacent a transverse line of weakening 122 and then the backing 121 bent along a transverse line of weakening to break off the required length. The selected length of material can then be formed into a circular shape as shown in FIG. 16.

The backing 121 has between each line of weakening 122 a pair of raised portions 123 defining a slot 124 underneath it. Alternative portions between the transverse lines of weakening have side flaps 125 which extend at least partially over the side of the intumescent material 120.

Figures 17, 18:
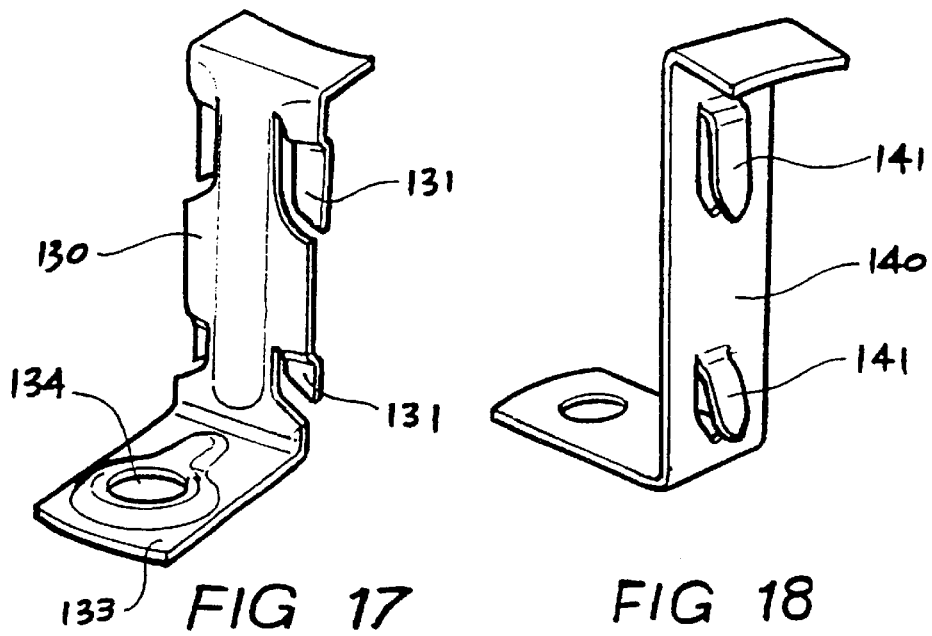
FIG. 17 shows an embodiment of a bracket suitable for use with the fire collar shown in FIG. 16.
FIG. 18 shows an alternative embodiment of bracket suitable for use with the fire collar shown in FIG. 16.

The circle of intumescent material formed as shown in FIG. 16 can be joined across the join 127 by means of the bracket shown in FIG. 17. The bracket 130 is fastened to the circle of fire collar strip so that the pins 131 extend into respective slots 124 across the join to provide a mounting bracket and to hold the strip in place. The bracket 130 includes a foot 133 with an aperture 134 so that the formed fire collar can be mounted to a surface.

Where a join in the continuous length of fire collar material is not necessary the bracket shown in FIG. 18 may be used. This bracket 140 has two pins 141 spaced apart and adapted in use to extend into respective slots 124 in the continuous strip material.

Figure 22:
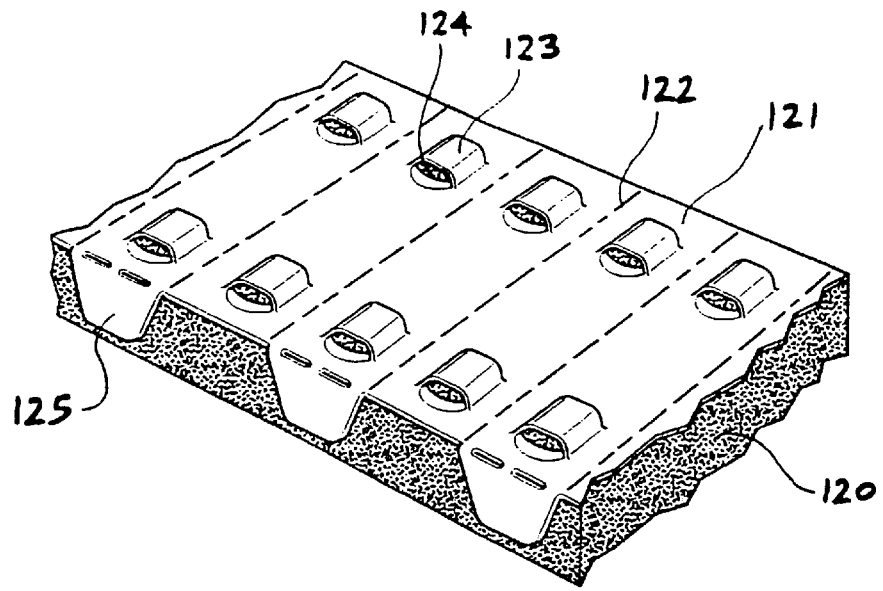
FIG. 22 shows a portion of a continuous strip of fire collar material suitable for forming the fire collar shown in FIG. 16.

It will be noted that the continuous strip material shown in FIG. 22 can be used either way up as the slots are continuous under the raised portions 123.

FIGS. 19, 20, 21 and 23 show a still further embodiment of continuous strip materal, a fire collar made from the continuous strip material and brackets to hold the fire collar.

Figure 23:
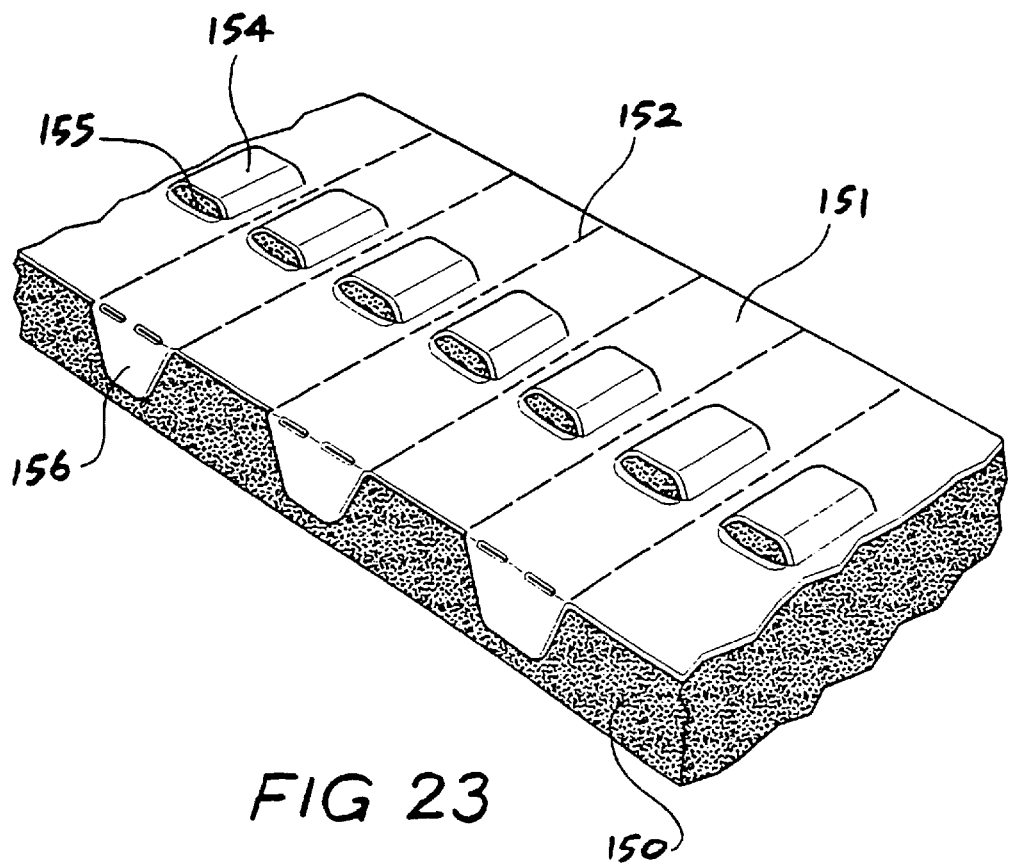
FIG. 23 shows an alternative embodiment of the continuous strip service shut off device material suitable to manufacture the fire collar shown in FIG. 19.

The continuous strip material as shown in FIG. 23 includes an intumescent material 150 with a metal backing 151 which has transverse lines of perforations 152 at regular intervals along its length. The continuous strip may be bent to form a required shape around a service line with bending occurring at the transverse lines of perforations 152 and the transverse lines of perforation also provide a region by which the strip material may be cut to a required length.

The continuous strip of material has a single row of raised portions 154 defining slots 155 underneath them. One raised portion is provided on each segment between transverse perforated lines 152.

As seen in FIG. 19 a selected length of continuous material has been cut to fit around a cylindrical pipe and joined by fastening a bracket 160 across the join 161. Each bracket 160 has an upright portion 162 a foot 163 extending out from the upright portion and having an aperture 164 and an upper flange 165. On the upright portion 162 there are a pair of pins 166. The pins are dimensioned and positioned to fit into adjacent slots 155. These adjacent slots 155 can be across a join such as the join 161 or adjacent slots at other portions around the periphery of the formed fire collar shown in FIG. 19.

Any required number of brackets 160 may be used depending upon the size of the collar.

The intumescent material used with the various embodiments of service shut off device of the present invention may be of any convenient formulation which produces a material which has sufficient flexibility to be wound around into the circular shape as required. It will be noted that the intumescent material in the flat strip is the same length as the casing but when the strip is formed into a circular service shut off device it must be shorter particularly on the inner edge.

Figure 4:
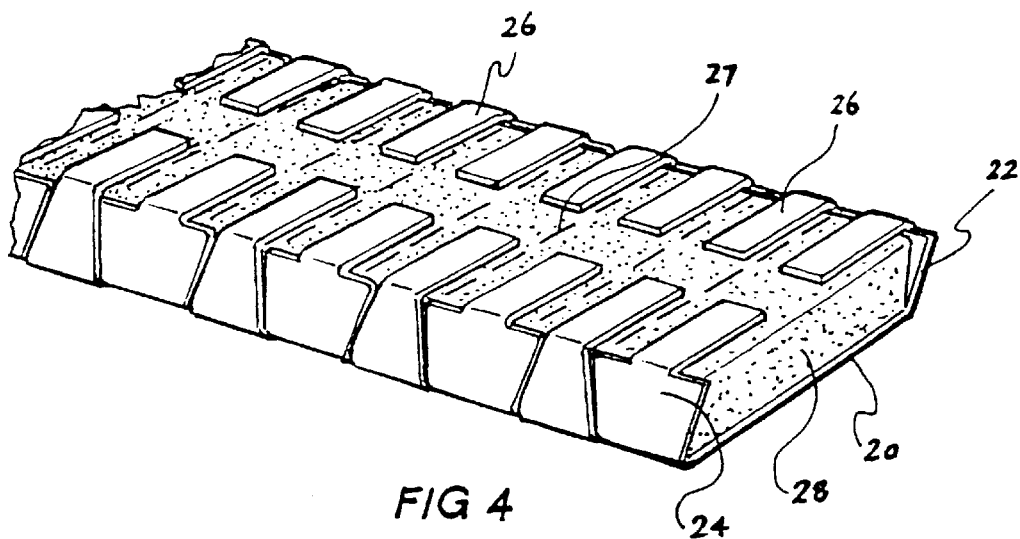
FIG. 4 shows a portion of a continuous strip of fire collar material.
Figure 5:
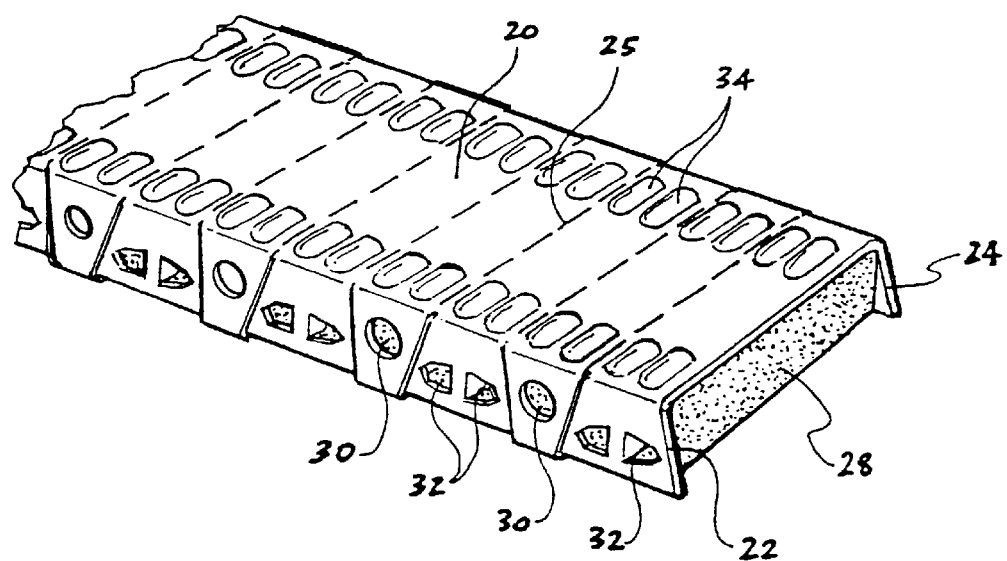
FIG. 5 shows the other side of the continuous strip shown in FIG. 4.

In one form the intumescent material 28 as shown in FIG. 4 may include a plurality of voids to make the material slightly spongy so that it can be easily bent and easily reduce in length for the lesser internal diameter when formed into the circular shape. The intumescent material may have a backing material which is a non woven fibrous material to help it retain its strip form with the non woven fibrous material severed at intervals to provide lines of weakening for cutting of the new strip of casing and intumescent material to a required length.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

What is claimed is:

1. A service shut off device comprising a continuous strip of fire collar material including a flexible casing, a continuous flexible intumescent material within the casing and a retention arrangement to retain the intumescent material within the casing, the strip comprising the casing and intumescent material adapted to be severed at a selected length along the length of the continuous strip whereby the strip can be severed at the selected length and the severed portion wrapped around a service line such as a pipe or cable tray to provide a fire collar, wherein the casing has transverse lines of weakening at regular positions along the length of the casing and the transverse lines of weakening are provided by a plurality of lines of perforations transverse to the length of the strip.

2. The service shut off device comprising a selected length of a continuous strip of fire collar material as claimed in claim 1 adapted to be formed into a shape to fit in use around a service line, the continuous strip of fire collar material including a flexible casing and a continuous flexible intumescent material within the casing, the strip comprising the casing and intumescent material adapted to be severed at a selected length along the length of the continuous strip whereby the strip can be severed at the selected length and the severed portion wrapped around a service line such as a pipe or cable tray to provide a fire collar, the service shut off device further comprising a retention arrangement associated with the casing to contain the intumescent material within the casing and means to retain the collar in a selected shape around the service line.

3. The service shut off device as in claim 2 wherein the flexible casing is substantially U-shaped with the intumescent material received in the hollow of the U-shape.

4. The service shut off device as in claim 2 wherein the flexible casing provides a backing for the intumescent material, provides a backing and one edge or provides a backing and two edges.

5. The service shut off device as in claim 2 wherein the flexible casing is made from a metallic material such as sheet aluminum, stainless steel or steel and is anodised or galvanised to prevent corrosion in an installation.

6. The service shut off device as in claim 2 wherein the flexible casing is a perforated sheet metal.

7. The service shut off device as in claim 2 wherein the flexible casing is manufactured from a composite material such as a glass reinforced material or the like.

8. The service shut off device as in claim 2 wherein the means to retain the collar in the selected shape such as a circular shape is a wire or other strap material which can be wound around the collar when it is formed into the selected shape and joined to hold the collar in that selected shape.

9. The service shut off device as in claim 2 wherein the retention arrangement is an adhesive.

10. The service shut off device as in claim 2 wherein the retention arrangement includes a plurality of tabs associated with the casing which extend against or into the intumescent material.

11. The service shut off device as in claim 2 wherein the body of intumescent material is transversely cut or perforated at intervals to assist with selection of the required length of the service shut off device.

12. The service shut off device as in claim 2 wherein the means to retain the collar in the selected shape includes a link member, the link member having a plurality of pins adapted to co-act with apertures on the casing across a join in the casing whereby the collar is retained in the selected shape.

13. The service shut off device as in claim 2 wherein the service shut off device is adapted to be formed around a service line within a wall or soffit.

14. The service shut off device as in claim 2 wherein the service shut off device is adapted to be mounted against a wall or soffit.

15. The service shut off device as in claim 2 further including at least one bracket either associated with the casing or being a separate bracket which can be fastened onto the casing to hold the service shut off device against a wall or soffit.

16. The service shut off device as in claim 15 including a plurality of co-acting connecting pieces on the bracket and the casing so that the bracket is retained on the casing.

17. The service shut off device as in claim 16 wherein the co-acting connecting piece between the casing and the bracket also acts as a connector between the ends of the casing of the composite body to both retain the casing in the selected shape and to be used as a bracket.

18. The continuous strip fire collar material as in claim 1 wherein the transverse lines of weakening also provide the regions at which the strip of material can be severed to form the individual lengths for the fire collar and also enable it to be bent around or wrapped around to form a selected shape for the fire collar.

19. The continuous strip fire collar material as in claim 1 wherein the body of intumescent material is transversely cut or perforated at intervals to assist with selection of the required length of the continuous strip of fire collar material.

20. The continuous strip fire collar material as in claim 1 wherein the retention arrangement to contain the intumescent material within the casing is an adhesive.

21. The continuous strip fire collar material as in claim 1 wherein the retention arrangement to contain the intumescent material within the casing includes lugs formed in the casing or bent out of the plane of the casing to extend against or into the intumescent material.

22. The continuous strip fire collar material as in claim 1 wherein the casing is comprised of a face section and two side sections adapted in use to provide a substantially U-shaped body and lugs bent out of the casing to extend against or into the intumescent material within the casing to retain the intumescent material in the casing are provided on the face of the casing or on one of the side sections.

23. The continuous strip fire collar material as in claim 1 wherein the flocible casing is a perforated sheet metal.

24. The continuous strip fire collar material as in claim 1 wherein the casing is comprised of a backing for the intumescent material or a backing and one edge.

25. The continuous strip fire collar material as in claim 1 wherein the casing is comprised of a face section and two side sections, wherein the side sections are formed from a plurality of tabs configured such that upon bending of the continuous strip into a selected shape such as a circular shape the tabs enable the inner side of the strip to form a smaller radius than the outer side and the tabs overlap or pass under adjacent tabs to enable the bending.

26. The continuous strip fire collar material as in claim 25 including on the casing two bend lines between the face section and each side section with the lines separated by essentially the thickness of the casing material and alternate tabs bent on one of the lines and the in between tabs bent on the other of the lines.

27. The continuous strip fire collar material as in claim 25 including a bend line for each tab of the plurality of tabs angled to the direction of elongation of the strip so that during bending each tab passes under the adjacent tab on one side and over the adjacent tab on the other side.

28. The continuous strip fire collar material as in claim 25 further including from one or both of the side sections tongues extending from the side sections and which are folded over the intumescent material such that they are substantially parallel to the face of the casing, with one rtongue extending from each tab on each side.

29. The continuous strip fire collar material as in as in claim 1 further including brackets to mount the fire collar to a wall or ceiling or soffit in use.

30. The continuous strip fire collar material as in claim 29 wherein the brackets are adapted to clip onto the casing so that they are retained with the casing.

31. The continuous strip fire collar material as in claim 29 including a plurality of co-acting connecting portions on the brackets and collar so that the bracket can be retained onto the continuous strip.

32. The continuous strip fire collar material as in claim 31 wherein the co-acting connecting arrangement includes a plurality of slots formed in the casing with a plurality of pins on the brackets or alternatively the pins are provided on the casing and the slots on the brackets.

33. The continuous strip fire collar material as in claim 1 further including means to retain the continuous strip of material into a selected shape such as a circular shape.

34. The continuous strip fire collar material as in claim 33 wherein the means to retain the continuous strip of material comprises wire or other strip material adapted to be wrapped around the casing and joined together to form the selected shape of the fire collar.

35. The continuous strip fire collar material as in claim 33 wherein the means to retain the continuous strip of material comprises co-acting connecting portions on both ends of the strip when wrapped in the selected shape and on a bracket so that the bracket act as both the mounting bracket and retainer for the selected shape.

36. The service shut off device formed from the continuous strip fire collar material as defined in claim 1.

37. The service shut off device comprising a stack of two or more fire collars formed from the continuous strip fire collar material as defined in claim 1.

* * * * *